US010710557B2

(12) United States Patent
Belanger et al.

(10) Patent No.: US 10,710,557 B2
(45) Date of Patent: Jul. 14, 2020

(54) LIGHTED VEHICLE WASH DRYER ASSEMBLY WITH OPAQUE LETTERING ON HOUSING

(71) Applicant: WashMe Properties, LLC, Northville, MI (US)

(72) Inventors: Michael J. Belanger, Northville, MI (US); Jerry A. Kotrych, Livonia, MI (US); David L. Tognetti, Howell, MI (US)

(73) Assignee: Belanger, Inc., Northville, MI (US)

( * ) Notice: Subject to any disclaimer, the term of this patent is extended or adjusted under 35 U.S.C. 154(b) by 498 days.

(21) Appl. No.: 15/068,611

(22) Filed: Mar. 13, 2016

(65) Prior Publication Data

US 2017/0057471 A1  Mar. 2, 2017

Related U.S. Application Data

(60) Provisional application No. 62/208,924, filed on Aug. 24, 2015.

(51) Int. Cl.
*B60S 3/00* (2006.01)
*B60S 3/04* (2006.01)
(Continued)

(52) U.S. Cl.
CPC .............. *B60S 3/002* (2013.01); *B29C 41/04* (2013.01); *B29C 49/00* (2013.01); *B60S 3/04* (2013.01);
(Continued)

(58) Field of Classification Search
CPC . B60S 3/002; B60S 3/04; B29C 41/04; B29C 49/00; F26B 21/004;
(Continued)

(56) References Cited

U.S. PATENT DOCUMENTS 2,152,623 A * 4/1939 Belknap ................. G09F 13/04
40/579
2,850,823 A * 9/1958 Sauer ...................... G09F 13/06
40/541
(Continued)

FOREIGN PATENT DOCUMENTS

DE   202013103829 U1   11/2014
EP       0700814 A      3/1996
(Continued)

OTHER PUBLICATIONS

European International Search Report dated Nov. 2, 2016.
EP 16764005.1 Search Report, dated Feb. 3, 2020.

*Primary Examiner* — Edelmira Bosques
*Assistant Examiner* — Bao D Nguyen
(74) *Attorney, Agent, or Firm* — Dickinson Wright PLLC

(57) ABSTRACT

A dryer assembly for a vehicle wash system includes a plastic translucent housing having an exterior surface and a generally hollow interior. The housing includes an inlet opening with a motor unit in communication with the inlet opening for drawing air through the inlet opening into the hollow interior. The housing includes a plurality of nozzle portions in communication with the inlet opening and configured to emit high velocity air therefrom to remove water from an exterior surface of a vehicle while disposed in a vehicle treatment area. The housing includes a light source associated therewith for emitting light through the housing for viewing by the vehicle disposed in the vehicle treatment area. The housing includes lettering formed on the exterior surface of the housing with the lettering configured such that light emitted from the light source will not pass therethrough.

23 Claims, 7 Drawing Sheets

| (51) | Int. Cl. | |
|---|---|---|
| | B29C 41/04 | (2006.01) |
| | B29C 49/00 | (2006.01) |
| | F26B 21/00 | (2006.01) |
| | B29K 75/00 | (2006.01) |
| | B29L 22/00 | (2006.01) |

(52) U.S. Cl.
CPC ........ F26B 21/004 (2013.01); *B29K 2075/00* (2013.01); *B29K 2995/0029* (2013.01); *B29L 2022/007* (2013.01); *F26B 2210/12* (2013.01)

(58) Field of Classification Search
CPC ........ B29K 2995/0029; B29K 2075/00; B29L 2022/007
USPC .......................................................... 34/666
See application file for complete search history.

(56) References Cited

U.S. PATENT DOCUMENTS

| | | | | |
|---|---|---|---|---|
| 4,090,178 | A | * | 5/1978 | Norris ................. F21V 33/0076 340/506 |
| 4,979,316 | A | * | 12/1990 | Belanger ................. B60S 3/002 15/316.1 |
| 6,123,503 | A | | 9/2000 | Belanger et al. |
| 6,709,530 | B1 | | 3/2004 | Dietsch |
| 2010/0192991 | A1 | * | 8/2010 | Belanger .................. B60S 3/04 134/123 |
| 2011/0277792 | A1 | | 11/2011 | Turner |
| 2011/0277797 | A1 | * | 11/2011 | Turner ..................... B60S 3/00 134/123 |
| 2013/0185876 | A1 | | 7/2013 | Belanger |

FOREIGN PATENT DOCUMENTS

| EP | 1364847 A2 | 11/2003 |
|---|---|---|
| EP | 0700814 A1 | 3/2016 |
| JP | H1159341 A | 3/1999 |

* cited by examiner

LIGHTED VEHICLE WASH DRYER ASSEMBLY WITH OPAQUE LETTERING ON HOUSING

CROSS-REFERENCE TO RELATED APPLICATIONS

The present application claims priority to U.S. Provisional Patent Application Ser. No. 62/208,924, entitled "Vehicle Wash Dryer Assembly", filed Aug. 24, 2015, which is hereby incorporated by reference as though set forth fully herein.

TECHNICAL FIELD

The present disclosure relates generally to a lighted vehicle wash component. More particularly, the present disclosure relates to a dryer assembly for a vehicle wash facility which employs lights to provide improved aesthetics.

BACKGROUND OF THE DISCLOSURE

Vehicle wash facilities are generally known to have dark and dirty environments, which can make them unattractive to customers and potential customers. This environment results, in part, from the fact that current rotary brush components typically employ a cylindrical central hub design that is densely populated with a plurality of washing elements such that the hub is not visible either at rest or during operation. This densely populated hub also serves to block a great deal of light to a vehicle occupant as the wash component approaches the vehicle during the vehicle wash process due to the large volume of the washing elements. This can result in a significant darkening of the vehicle interior and an unpleasant wash experience for the vehicle occupant. Combine this darkness with windshields and side windows that are often covered with soapy water and visibility for vehicle occupants within current vehicle wash facilities is generally very low.

Consequently, some wash owners have made an attempt to brighten this environment and enhance a user's wash experience though the use of lighted arches and signs, to create somewhat of a "carnival" feel. Many vehicle wash facilities also employ lights and lighted signs as a way to advertise extra wash services like tire shine, sealer wax, and triple foam as well as to drive traffic to and create more revenue for their vehicle wash facility. While these lighted arches and lighted signs may be effective in drawing consumer attention to the wash or these extra services they offer, the lighting is very selective and does little to improve the overall environment within the vehicle wash facility.

Additionally, these lighted arches and signs are generally provided outside of or at the entrance end of the vehicle wash system in order to try and attract potential customers to take advantage of the vehicle wash services or to provide a positive impression for customers before they enter the vehicle wash system. More recently, as discussed in Applicants' U.S. Pat. No. 8,819,887, lights have been incorporated into vehicle wash components that rotate as the components rotate. This configuration allows the lights to be more easily seen by consumers while their vehicle is being treated such that the vehicle wash experience is less dark and intimidating. However, lighting effects have not been used in or adjacent the exit end of the vehicle wash system, which is generally the area visible to other motorists passing by the vehicle wash facility. Typically, any lights in other areas of the wash facility cannot be readily seen by others driving by the facility. Thus, the exit end of current vehicle wash systems are still dark, noisy and relatively intimidating to both customers and potential customers. Moreover, any lights in other parts of the wash facility have only a limited effect on the marketing of wash services to vehicles passing thereby as they cannot be readily seen.

Another disadvantage of current vehicle wash configurations is that they share a largely similar, utilitarian appearance that makes it correspondingly difficult for wash owners to provide a distinctive or memorable service offering to their customers. Lighted arches and signs that are used in existing wash facilities do little to overcome this problem as any attempted branding created thereby is obstructed to vehicle occupants during the wash process, as discussed above. Moreover, while the lighted brushes in U.S. Pat. No. 8,819,887 provide significant improvements in this regard, the dark exit end, which is the last portion of the wash system encountered by vehicles, can negatively affect a user's wash experience.

It would thus be desirable to provide a vehicle wash component that addresses these issues.

SUMMARY OF THE DISCLOSURE

It is therefore an aspect of the present disclosure to provide a lighted dryer assembly for a vehicle wash facility that provides improved aesthetics.

It is another aspect of the present disclosure to provide a lighted dryer assembly for a vehicle wash facility that enhances customer experience during the wash process.

It is a further aspect of the present disclosure to provide a lighted dryer assembly for a vehicle wash facility that assists in creating and/or enhancing brand recognition.

It is a still another aspect of the present disclosure to provide a lighted dryer assembly for a vehicle wash facility that can brighten the environment therein and particularly at an exit end of the wash facility.

It is yet another aspect of the present disclosure to provide a lighted dryer assembly for a vehicle wash facility that yields enhanced brightness and aesthetics when not in use.

It is still yet another aspect of the present disclosure to provide a lighted dryer assembly for a vehicle wash facility that provides confirmation to a customer that a particular event is occurring, such as an ordered service.

In accordance with the above and the other aspects of the present disclosure, a lighted dryer for a vehicle wash system is provided. The lighted dryer includes a plastic translucent housing having an exterior surface and a generally hollow interior. The housing includes an inlet opening and a motor unit in communication with the inlet opening for drawing air through the inlet opening into the hollow interior. The housing includes a plurality of nozzle portions in communication with the inlet opening and configured to emit high velocity air therefrom for removing water from an exterior surface of a vehicle while disposed in a vehicle treatment area. The housing includes a light source associated therewith which is configured to emit light through the housing for viewing by the vehicle disposed in the vehicle treatment area. The housing includes lettering formed on its exterior surface. The lettering is configured such that light emitted from the light source will not pass therethrough.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

Figure 1:
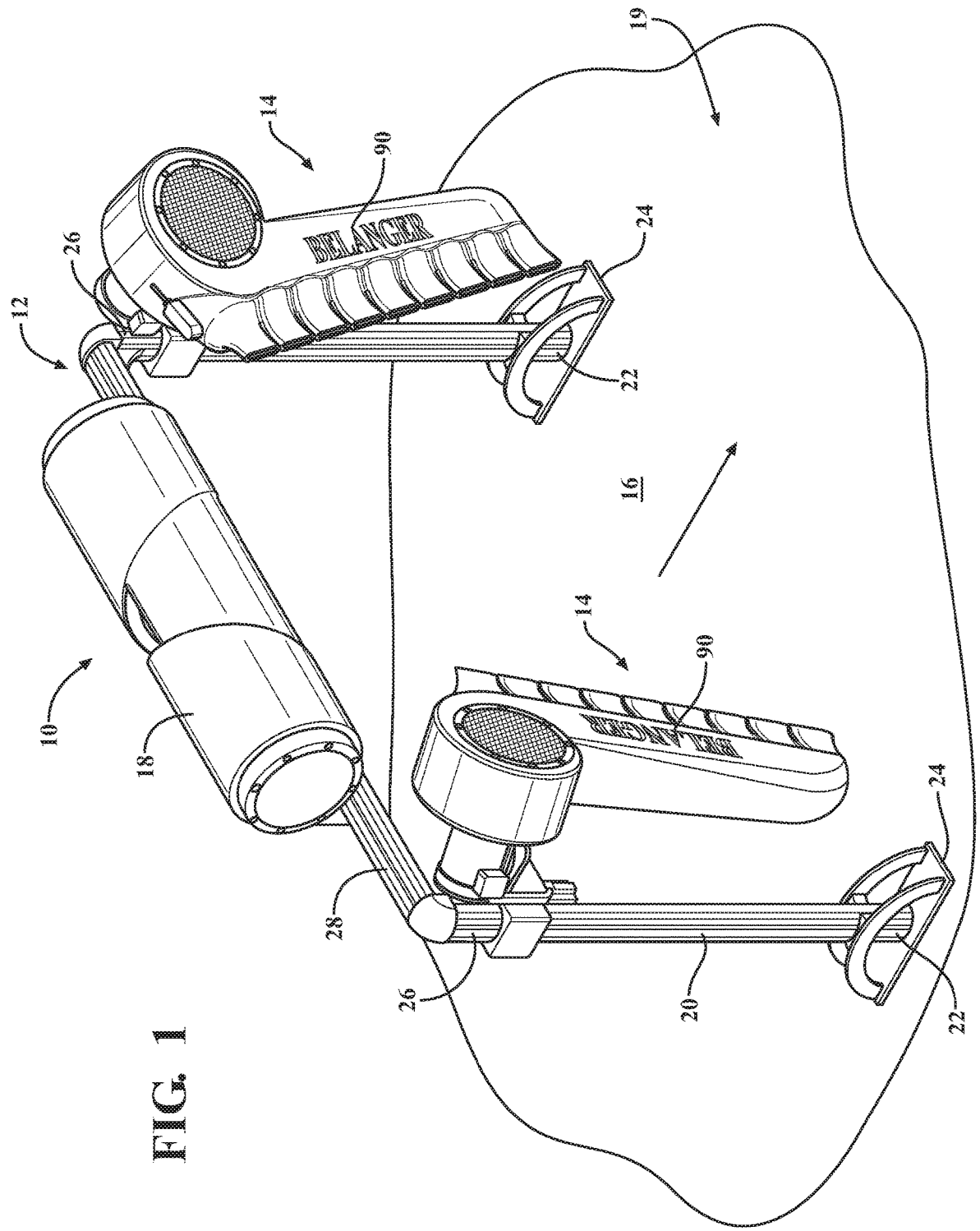
FIG. 1 is a perspective view of a lighted vehicle wash dryer assembly including a pair of opposing blower assemblies in accordance with an aspect of the present disclosure.
Figure 2:
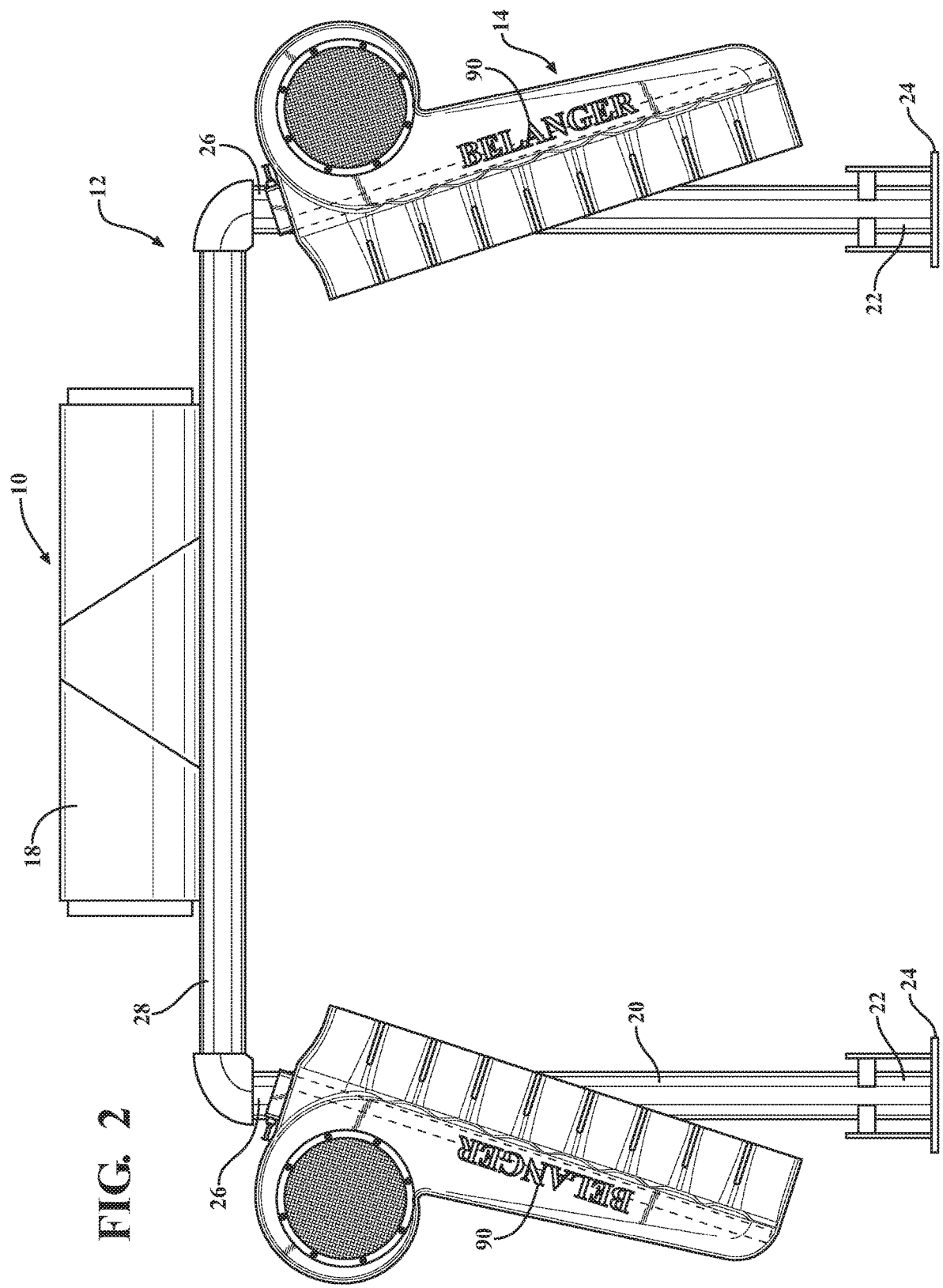
FIG. 2 is a front view of a lighted vehicle wash dryer assembly including a pair of opposing blower assemblies in accordance with an aspect of the present disclosure.

According to an aspect, the present disclosure relates to a treatment component for a vehicle wash system. More specifically, the present disclosure relates to a dryer assembly 10 for use in removing excess water from an exterior surface of a vehicle as part of a vehicle wash process. According to an aspect, the dryer assembly 10 may emit high velocity air onto a vehicle exterior to remove excess water therefrom. According to a further aspect, the dryer assembly 10 may be configured to emit water and air in order to remove water and/or soap from a vehicle exterior. An exemplary device for emitting water and air is disclosed in Applicant's co-pending application Ser. No. 14/673,157, filed Mar. 30, 2015, and entitled "Vehicle Treatment Apparatus that Emits Air and Water", which is hereby incorporated by reference herein.

According to an aspect, the dryer assembly 10 may be utilized as part of a vehicle wash system. It will be appreciated that the vehicle wash system may be configured as a tunnel car wash where a vehicle is conveyed through the wash process by a conveyor or the like as is known in the art. Alternatively, the vehicle wash system may be configured as a roll-over type system where the vehicle remains stationary and the various treatment components may be translated and/or moved with respect to the vehicle to perform the vehicle wash process. The disclosed dryer assembly may be employed in connection with other suitable wash processes and systems as are known. According to an aspect, the vehicle wash system may be housed within a vehicle wash facility having an entrance end where a vehicle enters, an exit end where the vehicle leaves, and a vehicle treatment area where the vehicle is cleaned. It will be appreciated that the disclosed dryer assembly 10 could also be employed in connection with a variety of other applications outside of a vehicle wash system, such as a manual wash or self-serve wash process.

According to a further aspect, an exemplary vehicle wash system into which the disclosed component may be incorporated can include a plurality of vehicle wash components that engage and/or treat the exterior of a vehicle as it passes through the vehicle wash facility to effectuate a vehicle wash process. For example, the components can include a rinse arch, which sprays water onto a vehicle to wet the exterior surface for further processing. Another component can include a bubble device that generates bubbles and emits them directly onto a vehicle exterior in order to provide a supply of soap for cleaning purposes. Other components may include one or more top brushes for contacting a top exterior surface of a vehicle, a plurality of side brushes for contacting side exterior surfaces of a vehicle and a plurality of wrap brushes for contacting front and back surfaces of a vehicle. Another component may include wheel scrubbers for engaging vehicle wheels. According to a further aspect, the system can include a wheel polishing device for treating vehicle wheels.

It will be appreciated that more, less or different wash components may be employed. Additionally, multiples of the same components may be employed as part of the system, as desired. Further, the components may take on a variety of different configurations. Moreover, the order, placement and sequence of the components within the system may also vary. According to an aspect, the components may be designed to engage and/or treat a vehicle disposed within the vehicle treatment area of the vehicle wash facility.

With reference to FIG. 1, the dryer assembly 10 can include a frame portion 12, a pair side blower assemblies 14, which are disposed on the frame portion 12 on either side of a vehicle treatment area 16 to direct air onto side vehicle surfaces, and an overhead blower assembly 18 disposed on the frame 12 to direct air onto an upper exterior surface of a vehicle in the vehicle treatment area 16. The dryer assembly 10 may be disposed at or adjacent an exit end 19 of the vehicle treatment area 16. According to an aspect, the frame portion 12 can include a pair of leg portions 20, which are disposed on either side of the vehicle treatment area 16. Each leg portion 20 can include a lower end portion 22, which can engage a base portion 24 that rests on the ground to hold the leg portions 20 in a generally vertical position. The leg portions 20 can each also include an upper end portion 26 which can engage an overhead cross-piece portion 28 that spans the vehicle treatment area 16. It will be appreciated that the dryer assembly 10 and the frame portion 12 can take on a variety of different configurations. It will also be appreciated that more, less or differently configured blower assemblies 14 may be employed on the frame portion 12 and that they may be disposed in different locations on the frame portion 12.

FIGS. 3 through 7 schematically illustrate a blower unit 30 for a blower assembly 14 in accordance with an aspect of the disclosure. According to an aspect, the blower unit 30 can include a housing 31 with upper head portion 32, a body portion 34, and an outlet portion 36 including a plurality of nozzle portions 38. According to an aspect, the blower housing 31 may be a single integral structure that is formed from a plastic material in a rotational molding process. Pursuant to one aspect, the blower housing 31 may be formed form a polyurethane material. It will be appreciated that the blower housing 31 may be formed from a variety of different materials and that a variety of other suitable processes may be employed. According to a still further aspect, the blower housing 31 may be formed of a transparent or translucent material. Additionally, the blower housing 31 may be formed in a variety of different colors.

According to a further aspect, the upper head portion 32 can include a motor assembly opening 40 for receipt of a motor unit 42. The motor assembly opening 40 may be in communication with an interior blower cavity 44 disposed in the body portion 34 by way of an inlet opening 45. According to an aspect, the blower cavity 44 may serve as an air passageway that conveys air from the motor unit 42 toward a lower portion of the housing 30 in a direction generally indicated by arrow B. The interior blower cavity 44 may be in communication with each of the plurality of nozzle portions 38. According to another aspect, the nozzle portions 38 may be configured to generally taper outwardly from the body portion 34 to an air exit outlet 46. According to an aspect, the air exit outlets 46 can each have an area that is substantially smaller than the size of an area of the inlet opening 45. The nozzle portions 38 can have a variety of other configurations.

According to another aspect, a clearance opening 48 may be formed in an upper surface 50 of the housing 31. According to a further aspect, a clear elongated housing structure 52, such as a clear PVC pipe may be inserted into the clearance opening 48 and into the interior blower cavity 44. According to yet another aspect, an illumination source 54 may be disposed in the elongated housing structure 52 so that one or more illumination sources may be located within the dryer unit 30. According to an aspect, the housing structure 52 can serve to protect the illumination source 54 from the high velocity air that is present within the blower cavity 44. The illumination source 54 may be an array of light emitting diodes (LEDs); however a variety of other suitable illumination sources may be employed. According to an aspect, the illumination sources may be LEDs that are configured to emit light in accordance with the RGB color convention as directed by a controller 62. For example, the illumination source 54 may be directed to emit a variety of different colors. According to another aspect, the controller 62 may be configured to cycle the illumination source 54 through a variety of different colors. According to an aspect, the elongated housing structure 52 may be configured as a pipe and may extend the full height from the upper surface 50 to the lower surface 56 of the blower housing 31. It will be appreciated that it could extend a lesser portion of the height.

According to another aspect, the light source 54 could be otherwise associated with the housing such that it could illuminate the interior of the blower housing 31. The light source 54 could be disposed behind the blower housing 31, which can have an opening disposed adjacent the light source 54 such that the light could pass through the opening to illuminate the interior of the blower housing 31 and thus illuminate the housing. According to a further aspect, the blower housing 31 could serve as a light pipe such that the light source 54 may be positioned to emit light through the housing itself so as to illuminate the interior of the blower housing 31 making the blower housing 31 glow to provide a lighted effect. It will be appreciated that the light source 54 could be disposed in a variety of other locations to illuminate the blower housing 31 or provide other illuminating effects.

It will also be appreciated that the housing structure 52 can take on a variety of different configurations and may be formed of different materials and may be formed of different colors. It will be appreciated that the housing structure 52 should be formed of a material or configuration so that it can withstand the environment within the blower cavity 44. According to an example, the elongated housing structure 52 may be formed of a translucent material. It will be appreciated that any number of illumination sources 54 may be employed within the blower housing 31. The illumination sources 54 may be connected to or disposed within the blower housing 31 in a variety of suitable ways. For example, the illumination source 54 may be secured at both its upper and lower ends such as by a mechanical fastener or an adhesive. It will be further appreciated that more than one elongated housing structure 52 may be disposed in the blower housing 30 to hold multiple illumination sources 54. It will also be appreciated that the elongated housing structure 52 and the illumination sources 54 can be combined in a single unit. Alternatively, illumination sources 54 may be disposed in the blower housing 30 independent from and without any elongated housing structure 52.

Figure 3:
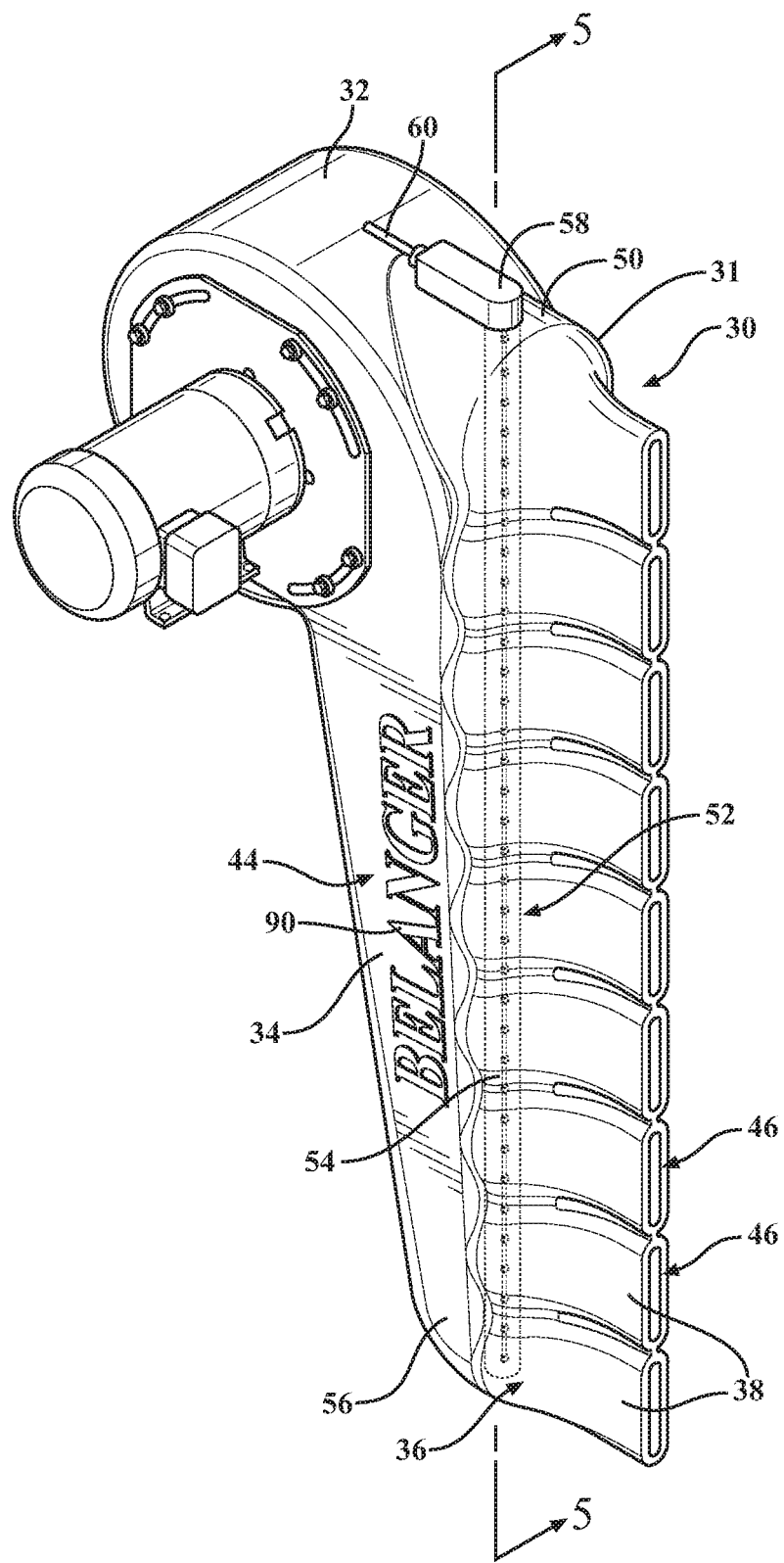
FIG. 3 is a schematic illustration of a blower assembly housing with an illumination source therein in accordance with an aspect of the present disclosure.
Figure 4:
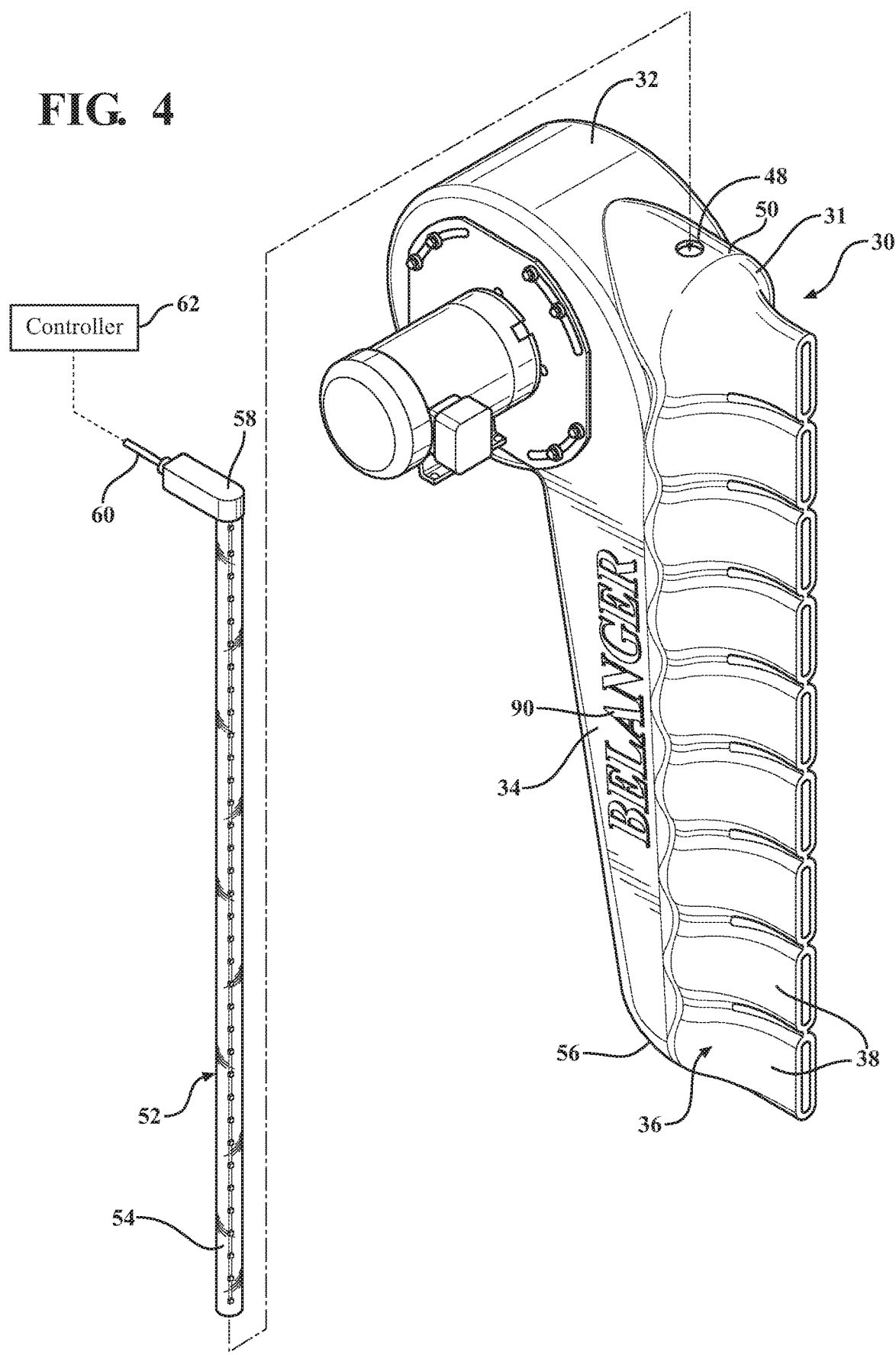
FIG. 4 is an exploded view of a blower assembly and illumination source in accordance with an aspect of the present disclosure.
Figure 5:
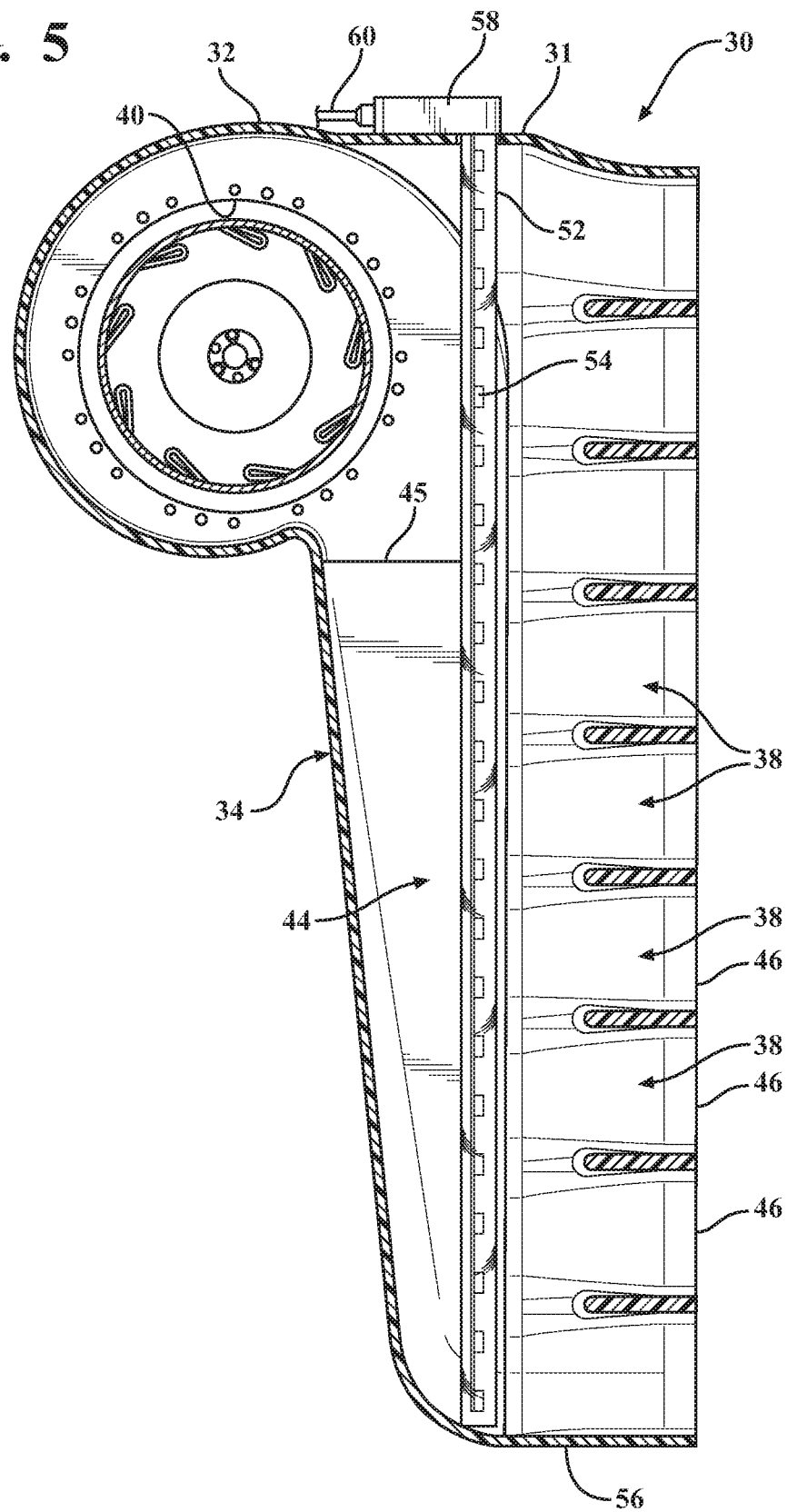
FIG. 5 is a cross-sectional view of the blower assembly housing of FIG. 3 in the direction of the arrows 5-5.
Figure 6:
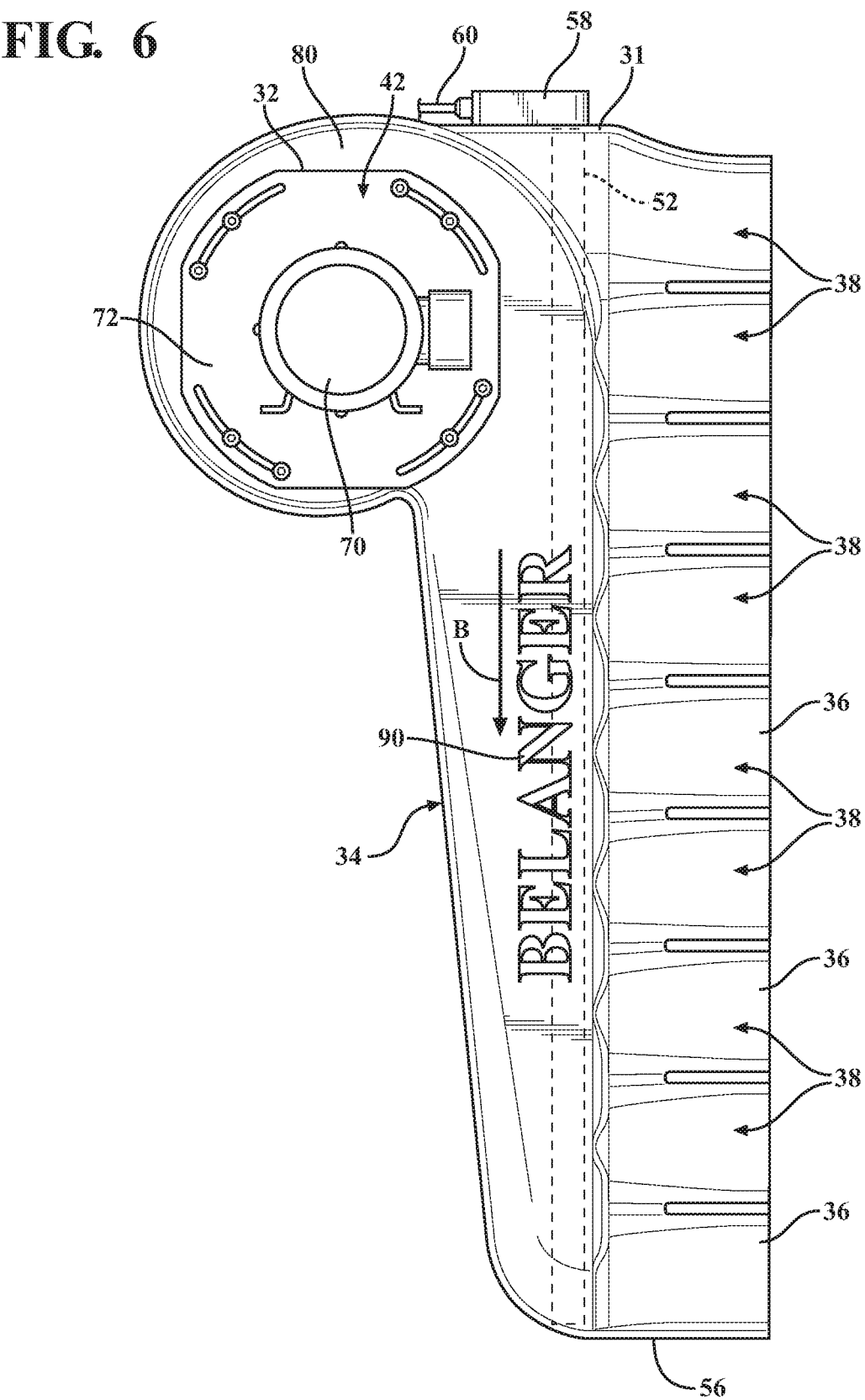
FIG. 6 is a front view of a blower assembly in accordance with an aspect of the present disclosure.
Figure 7:
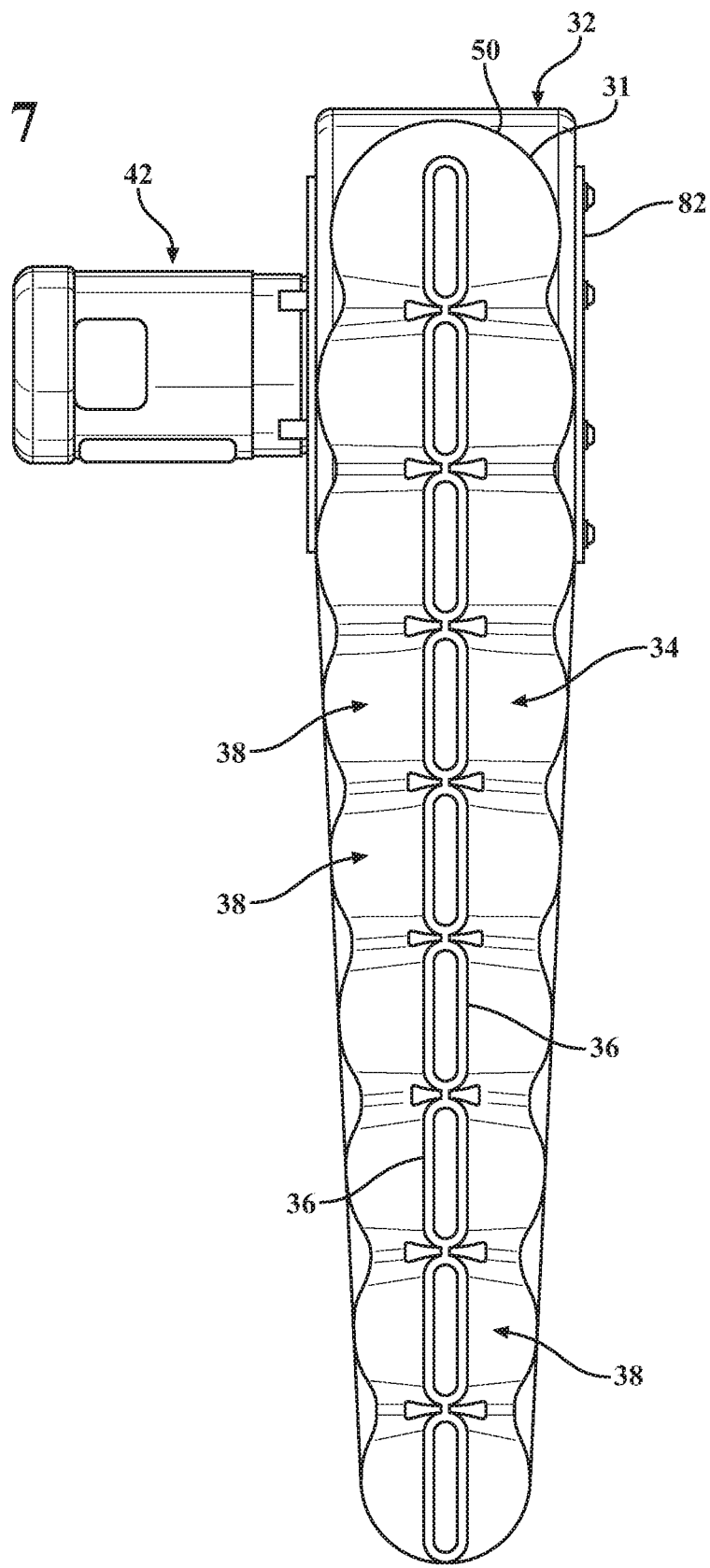
FIG. 7 is a side view of a blower assembly in accordance with an aspect of the present disclosure.

According to an aspect and with reference to FIGS. 3 and 4, a conduit box 58 may be disposed on the upper surface 50 of the housing 31. The conduit box 58 may be configured to effect an electrical connection between the illumination sources 54 and an electrical power source (not shown) to provide power thereto. According to another aspect, an electrical cord 60 may extend from the conduit box 58 for communication with a controller 62 to control lighting of the illumination sources 54. As will be appreciated, the conduit box 58 can include components for assisting the enabling and disabling of the illumination sources 54, as directed by the controller 62. According to a further aspect, the controller can turn the illumination sources 54 on to emit light through the housing 30 (enabled mode) and off such that no light is emitted from the illumination sources 54 (disabled mode). It will also be appreciated that the controller can direct the illumination source 54 to emit light in various colors or sequences of colors as directed. It will further be appreciated that the controller 62 can be in communication with other light sources in the vehicle wash system such that the illumination sources 54 may be activated and synchronized with other light sources in connection with a package confirmation function, as is disclosed in Applicant's co-pending U.S. patent application Ser. No. 14/687,704, filed Apr. 15, 2015, and entitled "Vehicle Wash Package Selection Confirmation System" and/or an active site marketing function, as is disclosed in Applicant's co-pending U.S. patent application Ser. No. 14/695,773, filed Apr. 24, 2015, and entitled "Active Site Marketing Vehicle Wash System", both of which are hereby incorporated by reference as though set forth fully herein. The illumination source 54 can also be activated to correspond with a variety of other functions or to convey information to a vehicle operator or a vehicle wash operator.

According to an aspect, the dryer unit 30 can include a motor unit assembly 42, which is secured to the blower housing 31. According to an aspect, the motor unit assembly 42 can be secured to a first side 80 of the upper head portion 32 by a mount plate 72. According to an aspect, the motor 70 may include a high speed impeller 74, which may be caused to rotate to draw air into a second side 82 of the upper head portion 32 via an air inlet portion. The air inlet portion may have a mesh layer disposed thereover to prevent large objects from being drawn into the blower housing 31. According to another aspect, the motor 70 may be an electric motor that is in communication with a source of power. However, a variety of other suitable types of motors or other power sources may be employed.

According to an aspect, the illumination source 54 may have an enabled mode and a disabled mode. In the enabled mode, the illumination source 54 may be activated by the controller 62 enabled such that it emits light. The emitted light can pass through the clear elongated housing structure 52 and through the translucent blower housing 31 such that it is visible by a vehicle in the treatment area 16. According to an aspect, the illumination source 54 can also cause the body of the blower housing 31 to glow, which provides a unique aesthetic appearance. In the disabled mode, the illumination source 54 may be turned off by the controller 62 such that no light is emitted therefrom and the blower housing 31 may be dark. The illumination sources 54 can be disposed in the housing in a variety of different locations and can be secure to the outside of the housing or formed as an integral unit with the housing.

According to another aspect, the blower housing 31 may be formed of a translucent material with opaque lettering 90 disposed thereon. The opaque lettering 90 may be configured to spell out a company name, as generally illustrated in the drawings. The opaque lettering 90 can be formed as part of the molding process. Alternatively, the lettering may have an opaque coating painted thereon after the forming process. According to an aspect, the lettering 90 may be formed such that it is raised with respect to the surrounding surfaces of the housing 31, such that lettering sidewalls extend from the sidewalls from the exterior surface of the housing to a front surface of the lettering. According to an aspect, the sidewalls of the lettering may either be opaque or translucent.

In operation, when the controller 62 activates the enabled mode of the illumination source 54, light is emitted that can pass through the translucent housing 31. According to an aspect, the inclusion of opaque lettering 90 on the housing that is dark (i.e. no light or substantially no light passes therethrough) when the housing 31 is illuminated in the enabled mode, can yield a dramatic appearance that draws attention to the lettering 90. The effect is akin to a sign where light shines on the lettering to spotlight it, such as on a marquis. It will be appreciated that the opaque lettering 90 can be utilized to display a variety of different information. For example, the lettering 90 may be utilized to convey navigational information.

According to another aspect, the housing 31 may be configured with a variety of different sets of lettering 90 that each convey different information. A separate illumination source 54 may be associated with each set of lettering. According to one example, one set of lettering may spell out "GO" and another set of lettering may spell out "STOP". According to an aspect, when a condition is satisfied, the controller 62 may cause the illumination source 54 to emit red light such that the word "STOP" is prominent. Similarly, when another condition is satisfied, the controller 62 may cause the illumination source 54 to emit green light such that the word "GO" is illuminated. A variety of other combinations of lettering and colored lights may be employed as desired.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. A dryer assembly for a vehicle treatment area, comprising:

a molded blower housing molded from a plastic translucent material and having an exterior surface, a clearance opening located in an upper surface thereof, a generally hollow interior and an air inlet opening adjacent to said clearance opening;

a motor unit in communication with said air inlet opening for drawing air through said air inlet opening into said hollow interior;

at least one nozzle portion in communication with said air inlet opening and configured to emit pressurized air at an exterior surface of a vehicle while disposed in said vehicle treatment area;

at least one LED light source associated with said blower housing and configured to emit light through said blower housing for viewing in said vehicle treatment area, said at least one LED light source disposed within a translucent tubular housing with said translucent tubular housing passing through said clearance opening and secured in said blower housing at said clearance opening and an upper end of said LED light source connected to a conduit box with said LED light source being suspended generally vertically inside a hollow interior of said translucent tubular housing;

said conduit box located on said upper surface of said blower housing, said conduit box providing electrical power to said at least one LED light source; and lettering molded from said plastic translucent material and located on said exterior surface of said housing, said lettering further having an opaque front surface.

2. The dryer assembly of claim 1, wherein said lettering includes sidewalls that extend outwardly from said exterior surface to said opaque front surface such that said lettering is raised with respect to said exterior surface of said housing.

3. The dryer assembly of claim 2, wherein said sidewalls of said lettering are opaque.

4. The dryer assembly of claim 2, wherein said at least one LED light source is an LED array that is configured to emit a plurality of different colors that can be seen in said vehicle treatment area.

5. The dryer assembly of claim 4, wherein said at least one LED light source has an enabled mode and a disabled mode and wherein said at least one LED light source is configured to communicate with a controller to activate said enabled and disabled modes upon satisfaction of one or more predetermined conditions.

6. The dryer assembly of claim 2, wherein said at least one nozzle portion is integrally formed with said housing.

7. The dryer assembly of claim 6, wherein said at least one nozzle portion includes a plurality of individual nozzle segments.

8. The dryer assembly of claim 7, wherein at least one of said plurality of individual nozzle segments is disposed above a cut-off segment.

9. The dryer assembly of claim 2 wherein said sidewalls of said lettering are translucent.

10. The dryer assembly of claim 1, wherein said opaque front surface consists of an opaque coating painted thereon.

11. A dryer assembly for use adjacent an exit end of a vehicle treatment area, comprising:
a molded blower housing having a clearance opening in an upper surface thereof, an air inlet portion adjacent to said clearance opening and a generally hollow interior cavity, said blower housing being molded from a translucent plastic material;
a blower assembly in communication with said air inlet portion for drawing air into said blower housing;
at least one nozzle portion in communication with said blower assembly to emit pressurized air onto a vehicle exterior;
at least one LED light source for illuminating said blower housing, said at least one LED light source configured to communicate with a controller so as to emit light in a variety of different modes, said at least one LED light source being connected at an upper end to a conduit box and suspended inside a clear tubular housing structure that is secured at an upper end to said clearance opening and that extends through said clearance opening into said hollow interior cavity and hangs therein;
said conduit box located on said upper surface of said housing, said conduit box providing electrical power to said at least one LED light source; and
said blower housing including lettering molded from said translucent plastic material and located on at least one exterior surface, said lettering having an opaque front surface such that light is prevented from passing through said opaque front surface.

12. The dryer assembly of claim 11, wherein said opaque front surface consists of an opaque coating painted thereon.

13. The dryer assembly claim 11, wherein said at least one LED light source is an LED array that is configured to emit a plurality of different colors that can be seen from an exterior of said housing.

14. The dryer assembly of claim 11, wherein said at least one LED light source is in communication with said controller to activate an enabled mode and a disabled mode of said at least one LED light source upon satisfaction of one or more predetermined conditions.

15. The dryer assembly of claim 11, further comprising:
a plurality of nozzle portions that are each an integral part of said blower housing; and
wherein said plurality of nozzle portions are configured to emit pressurized air from said blower housing in a direction perpendicular to a direction of air flow in an air passageway.

16. The dryer assembly of claim 15, wherein at least one of said plurality of nozzle portions are disposed above a cut-off segment.

17. The dryer assembly of claim 11, further comprising:
a plurality of LED light sources each located in its own clear tubular housing structure which are disposed in said blower housing and which are secured at an upper end to said clearance opening in the upper end of said blower housing.

18. The dryer assembly of claim 17, wherein said lettering consists of at least two groups of discrete letters and wherein each of said at least two groups of discrete letters is associated with a separate one of said plurality of LED light sources located within said blower housing.

19. The dryer assembly of claim 18, wherein said lettering is raised with respect to said exterior surface of said blower housing.

20. A dryer assembly for a vehicle treatment area, comprising:
a blower housing having an exterior surface, a clearance opening in an upper surface adjacent to an air inlet opening and a generally hollow interior, said blower housing being molded from a generally translucent plastic material;
a motor unit in communication with said air inlet opening for drawing air through said air inlet opening into said hollow interior;
at least one nozzle portion in communication with said air inlet opening and configured to emit pressurized air therefrom;
at least one LED light source associated with said blower housing and configured to emit light through said blower housing for viewing in said vehicle treatment area, said at least one LED light source being connected at an upper end to a conduit box and suspended inside a clear tubular housing structure that is secured at an upper end to said clearance opening and extends through said clearance opening into said hollow interior and freely therein;
said conduit box located on said upper surface of said blower housing, said conduit box providing electrical power to said at least one LED light source; and
at least one portion molded from said translucent plastic material on an exterior surface of said blower housing and having an opaque front surface for preventing light from passing through said at least one portion.

21. The dryer assembly of claim 20, wherein said exterior surface of said plastic housing includes a plurality of portions molded from said translucent plastic material and disposed on said exterior surface and that have an opaque front surface.

22. The dryer assembly of claim 21, wherein said plurality of portions having opaque front surfaces are individual letters.

23. The dryer assembly of claim 22, wherein said letters are raised with respect said exterior surface of said blower housing.

* * * * *